United States Patent [19]
Disanayaka

[11] Patent Number: 5,311,033
[45] Date of Patent: May 10, 1994

[54] LAYERED IMAGING STACK FOR MINIMIZING INTERFERENCE FRINGES IN AN IMAGING DEVICE

[75] Inventor: Bimsara Disanayaka, London, Canada

[73] Assignee: Minnesota Mining and Manufacturing Company, St. Paul, Minn.

[21] Appl. No.: 41,484

[22] Filed: Apr. 1, 1993

[51] Int. Cl.⁵ .................... G01T 1/24; G03G 15/044
[52] U.S. Cl. ......................... 250/591; 250/580
[58] Field of Search ............... 750/591, 580; 378/28, 378/24; 430/66, 69

[56] References Cited

U.S. PATENT DOCUMENTS

| | | |
|---|---|---|
| 2,992,101 | 2/1957 | Jelley et al. . |
| 3,411,907 | 3/1965 | Whitmore et al. . |
| 3,601,017 | 11/1969 | Glatzer et al. . |
| 4,235,959 | 11/1980 | Thijs et al. . |
| 4,575,398 | 3/1986 | Tschishow . |
| 4,618,552 | 10/1986 | Tanaka et al. . |
| 4,696,884 | 9/1987 | Saitoh et al. . |
| 4,701,393 | 10/1987 | Saitoh et al. . |
| 4,711,838 | 12/1987 | Grzeskowiak et al. . |
| 4,756,993 | 7/1988 | Kitatani et al. . |
| 4,798,776 | 1/1989 | Honda et al. . |
| 4,808,504 | 2/1989 | Honda et al. . |
| 4,959,289 | 9/1990 | Nishikawa et al. . |
| 4,961,209 | 10/1990 | Rowlands et al. ........ 250/591 |

Primary Examiner—Paul M. Dzierzynski
Assistant Examiner—Richard Hanig
Attorney, Agent, or Firm—Gary L. Griswold; Walter N. Kirn; Eric D. Levinson

[57] ABSTRACT

A layered imaging stack for minimizing interference fringes in an imaging device. A polymer layer has one flat surface and a second opposed surface that has a surface roughness, $R_A$, within the range of 0.5 μm to 2.5 μm. An adhesive layer provided on the roughened surface of the polymer layer has an index of refraction, $n_2$, which differs from the refractive index, $n_1$, of the polymer layer by at least 0.02. The multiplicative product of $R_A$ in μm and the absolute value of $n_2 - n_1$, $\Delta n$, is within the range of from about 0.01 to 0.05.

17 Claims, 1 Drawing Sheet

LAYERED IMAGING STACK FOR MINIMIZING INTERFERENCE FRINGES IN AN IMAGING DEVICE

FIELD OF THE INVENTION

The invention relates generally to imaging devices, and more particularly to means for minimizing interference fringes in such devices.

BACKGROUND OF THE INVENTION

A beam of radiation can be separated into two parts which follow different paths and are then brought back together to form a single beam. If the two paths are not of identical optical length, the two beams may not be in phase, and can destructively interfere at some points (resulting in areas of relative darkness), and constructively interfere at other points (resulting in areas of relative brightness). A beam can be split in two wherever it strikes a stack of transparent film. While some of the beam is reflected at the upper surface of the stack, the rest of the beam enters the stack and continues through it until it is reflected at some lower film surface at which time it continues back through the stack and exits the same side it entered. The difference in path lengths for the two rays is a function of the thickness of the additional film or films that the second ray passes through. The result is a fringe pattern of areas of relative darkness and lightness which gives a contour map of the thickness of the film(s) with each contour line representing a difference in thickness of $\lambda/2$, where $\lambda$ is the wavelength of the radiation used. This contour map-like pattern is commonly known as "Newton's Rings".

These interference patterns are especially troublesome when they occur in imaging systems, such as photographic equipment and digital radiation imaging systems. Digital radiation imaging systems employ photoconductive materials to absorb incident radiation representative of an image of an object. Suitable photoconductive materials will absorb the radiation and produce electron-hole pairs (charge carriers) which may be separated from each other by an electric field applied across the photoconductor, creating a latent image at the surface of the photoconductor (which is typically a thin planar layer). A narrow beam of scanning radiation substantially completes discharge of the photoconductor by creating the motion of a second set of charge carriers. The distribution of these second charge carriers in the plane of the photoconductor is affected by the distribution of the first charge carriers, i.e., by the latent image. The motion of the second charge carriers is detected and digitized in an appropriate circuit, thereby capturing the latent image in digital form.

Various methods for minimizing the effects of interference fringes have been patented. Several known methods involve the addition of particles dispersed in or on the top surface of a layered imaging stack to diffuse light rays. Other known methods include roughening or dimpling the top surface to induce light scattering.

The above methods reduce interference fringes to varying degrees. However, such reduction is commonly accompanied by a reduction in image resolution. It would be desirable to minimize the effects of interference fringes while at the same time maintaining good image resolution.

SUMMARY OF THE INVENTION

Accordingly, the present invention provides a layered imaging stack for minimizing interference fringes formed in an imaging device. The layered imaging stack includes a polymer layer having one substantially flat, planar surface and an opposite surface having a surface roughness, $R_A$. A polymer coating less than about 50 μm thick is provided on the side of the polymer layer having the surface roughness, $R_A$. The surface roughness, $R_A$, and the materials used for the polymer layer and the coating should be chosen so that the multiplicative product of $R_A$ and the absolute value of the difference between the indices of refraction, $\Delta n$, of the polymer layer and the coating is within the range of from about 0.01 to 0.05, where $R_A$ is given in μm. The coating preferably is about 5 μm to 15 μm thick and is preferably an adhesive. The absolute value of the difference in refractive indices is preferably within the range of from about 0.02 to 0.08. The average surface roughness, $R_A$, is preferably within the range of from about 0.5 μm to 2.5 μm. The coating preferably bonds the polymer layer to a photoactive layer.

BRIEF DESCRIPTION OF THE DRAWINGS

The invention will now be described by referring to the following Figures, wherein.

DETAILED DESCRIPTION

Figure 1:
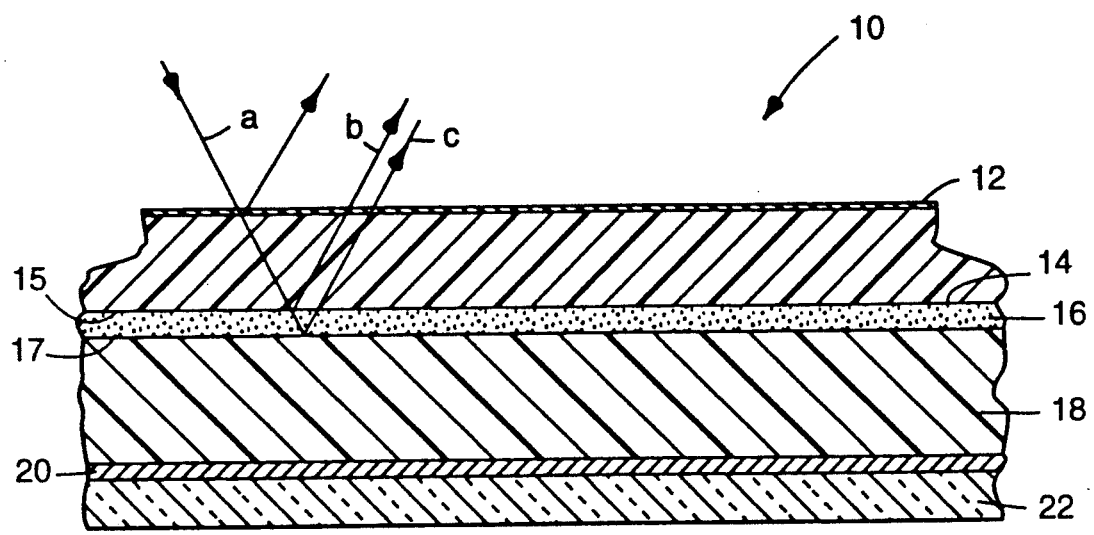
FIG. 1 shows a schematic cross-sectional side view of a prior art layered imaging stack for radiation imaging.

Prior art layered imaging stack 10 for use in x-ray imaging is shown in FIG. 1. Layered imaging stack 10 is comprised of transparent conductive layer 12, dielectric layer 14, adhesive layer 16, photoactive layer 18, conductive layer 20, and insulative glass substrate 22. Transparent conductive layer 12 is typically indium tin oxide (ITO) and dielectric layer 14 is typically a polymer. Photoactive layer 18 is typically a photoconductor.

During use, a large electric field (5–10 V/μm) is maintained across the layered imaging stack 10 by applying a potential difference between conductive layer 20 and transparent conductive layer 12. An object to be x-rayed is placed between an x-ray source and the charged layered imaging stack 10. X-rays which pass by or through the object will be absorbed in the photoactive layer 18, creating electron-hole pairs which become separated by the electric field. X-rays which are absorbed by the object will not reach the layered imaging stack 10, thereby creating a latent image at the upper surface 17 of photoactive layer 18. The exposed layered imaging stack 10 is then transferred to a laser scanner to read the latent image.

During the image readout phase, a high voltage is maintained across the layered imaging stack 10. A narrow, focused laser beam (a) of scanning radiation is directed toward layered imaging stack 10. Some part of beam (a) is reflected at the top surface of stack 10. The rest of beam (a) travels through dielectric layer 14 towards adhesive layer 16. Part of the remainder of beam (a) will be reflected as beam (b) at the lower surface 15 of dielectric layer 14. The rest of beam (a) will travel through adhesive layer 16 until it hits the photoactive layer 18, where part of the light is absorbed by the photoactive layer and the rest is reflected as beam (c) at the upper surface 17 of the photoactive layer. The radiation absorbed by photoactive layer 18 will effectively separate charge pairs in the unexposed regions of the photoactive layer, thereby creating a positive charge in the conductive layer 20. The positive charge can then be amplified, integrated and converted to a digital signal. The digitized signal can then be read to form a real image from the latent image.

As can be seen in FIG. 1, reflected beams (a, b and c) are each parallel to each other, but have different phases due to the different distances that each has traveled. This results in the interference fringes and Newton's Rings described above. It should be noted that even if there were no beam (c) in FIG. 1, i.e., there was no radiation reflected at lower surface 17, interference fringes formed by interference between beams (a) and (b) would still be present. Interference fringes will be formed whenever beam (a) is divided into two or more beams that travel along different paths.

Figure 2:
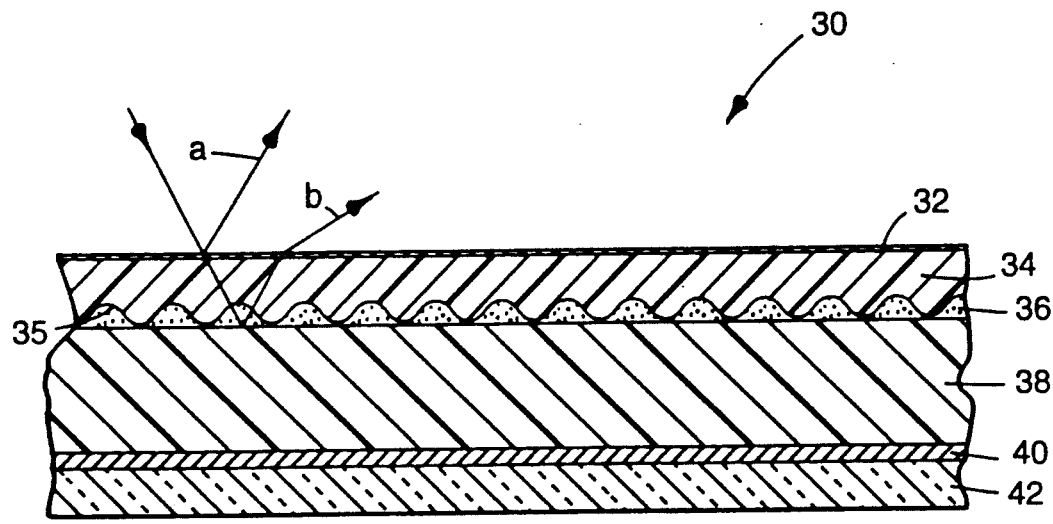
FIG. 2 shows a schematic cross-sectional side view of a layered imaging stack for minimizing interference fringes according to the present invention.

A layered imaging stack 30 for use in x-ray imaging according to the invention is shown in FIG. 2. Layered imaging stack 30 is comprised of transparent conductive layer 32, dielectric layer 34, adhesive layer 36, photoactive layer 38, conductive layer 40, and substrate 42. The lower surface 35 of dielectric layer 34 is roughened. The surface roughness, $R_A$, of lower surface 35 of dielectric layer 34 is preferably within the range of from about 0.5 $\mu$m to 2.5 $\mu$m, more preferably from about 1 $\mu$m to 2 $\mu$m, and most preferably about 1.5 $\mu$m. At a minimum, the average surface roughness, $R_A$, should always be greater than about half of the wavelength $\lambda$ of the scanning radiation being used.

Transparent conductive layer 32 is preferably indium tin oxide (ITO) and has a thickness within the range of from about 10 nm to 75 nm. Dielectric layer 34 is preferably a polymer having high dielectric strength and a dielectric constant of less than 3.5, such as polycarbonate. Dielectric layer 34 preferably has a thickness of about 75 $\mu$m to 250 $\mu$m.

Adhesive layer 36 preferably has a dielectric constant of less than about 4.0. Adhesive layer 36 is preferably an ultra-violet (UV) curable adhesive, such as Norland Optical Adhesive 61, available from Norland Products, Inc., New Brunswick, N.J. The average thickness of adhesive layer 36 is preferably less than 50 $\mu$m, more preferably less than 30 $\mu$m, and most preferably within the range of from about 5 $\mu$m to 15 $\mu$m. While layer 36 is preferably an adhesive, it may also be any transparent polymeric coating that possesses the same physical characteristics.

I have determined that there is an inverse mathematical relationship between the desired surface roughness, $R_A$, of the lower surface 35 of dielectric layer 34 and the absolute value of the difference, $\Delta n$, between the index of refraction, $n_1$, of the dielectric layer and the index of refraction $n_2$, of adhesive layer 36. The multiplicative product of $R_A$ and $\Delta n$ is preferably within the range of from about 0.01 to 0.05, where $R_A$ is given in micrometers, $\mu$m. The preferred ranges for $R_A$ are given above. The difference in refractive indices, $\Delta n$, is preferably greater than about 0.02, and more preferably, is within the range of from about 0.02 to 0.08.

Photoactive layer 38 can be either photoconductive or photosensitive. A preferred photoconductor is amorphous selenium. Conductive layer 40 is preferably a 200 nm thick vapor-deposited aluminum coating. Substrate 42 is preferably an insulative substrate, such as glass.

Latent images are formed and read in the manner described above with respect to the layered imaging stack 10. As scanning radiation beam (a) is directed toward layered imaging stack 30, some part of beam (a) is reflected at the top surface of the stack. The rest of beam (a) travels through dielectric layer 34 and into adhesive layer 36, where it is reflected as beam (b). Beam (b) travels back through adhesive layer 36, dielectric layer 34, and re-emerges from the conductive layer 32. Because of the surface roughness, $R_A$, of the lower surface 35 of the dielectric layer 34, beam (b) is not parallel to reflected beam (a), and thus interference fringes are not seen.

If the absolute value of the difference, $\Delta n$, between the refractive indices of the dielectric layer 34 and the adhesive layer 36 is increased, the amount of light scattered by the roughened surface 35 will increase, thereby further reducing the effects of interference fringes. However, increasing $\Delta n$ may also decrease image resolution. Thus, the value of $\Delta n$ should be within the range of from about 0.02 to 0.08.

The invention will now be illustrated by the following non-limiting example.

EXAMPLE

A radiation detector having a layered imaging stack resembling layered imaging stack 30 was built. A layer of amorphous selenium 425 $\mu$m thick was vapor deposited on an aluminum coated polished glass substrate. A polycarbonate film having a thickness of 175 $\mu$m and a matte finish on the side facing the selenium was laminated to the selenium by a UV curable acrylate adhesive to form the dielectric layer. Optical grade polycarbonate film having a refractive index of 1.586 was used. The adhesive used was Norland Optical Adhesive No. 61, which has a refractive index of 1.56. The adhesive was cured in UV light for 5 minutes. A layer of 75 nm thick ITO having a resistance of 100 ohms per square was deposited on top of the dielectric layer on the top of the layered imaging stack.

A latent x-ray image on the detector plate was read using a 442 nm laser beam having a width of 100 $\mu$m. In the resultant digital image, the presence of interference fringes was virtually eliminated and the resolution was 5.8 line pairs per millimeter.

I claim:

1. A layered imaging stack for minimizing interference fringes in an imaging device, including:
    a polymer layer having an index of refraction, $n_1$, and having a first substantially planar major surface and a second opposed major surface having a surface roughness, $R_A$; and
    a polymeric coating provided on the second surface of the polymer layer, the coating having an index of refraction, $n_2$, and a thickness of less than 50 $\mu$m, wherein the multiplicative product of $R_A$ and $\Delta n$ is within the range of from about 0.01 to 0.05, where $\Delta n$ is defined as the absolute value of $n_2 - n_1$, and $R_A$ is in $\mu$m.

2. The layered imaging stack of claim 1, wherein the coating is an adhesive.

3. The layered imaging stack of claim 1, wherein the thickness of the coating is within the range of from about 5 $\mu$m to 15 $\mu$m.

4. The layered imaging stack of claim 1, wherein $\Delta n$ is greater than about 0.02.

5. The layered imaging stack of claim 4, wherein $\Delta n$ is less than about 0.08.

6. The layered imaging stack of claim 1, wherein $R_A$ is within the range of from about 0.5 $\mu$m to 2.5 $\mu$m.

7. The layered imaging stack of claim 3, wherein $\Delta n$ is within the range of from about 0.02 to 0.08, and $R_A$ is within the range of from about 0.5 $\mu$m to 2.5 $\mu$m.

8. The layered imaging stack of claim 2, wherein the thickness of the coating is within the range of from about 5 $\mu$m to 15 $\mu$m, wherein $\Delta n$ is within the range of from about 0.02 to 0.08, and wherein $R_A$ is within the range of from about 0.5 $\mu$m to 2.5 $\mu$m.

9. The layered imaging stack of claim 1, further including a photoactive layer provided on the side of the coating opposite the polymer layer.

10. A layered imaging stack for minimizing interference fringes in an imaging device, including:
   a polymer layer having an index of refraction, $n_1$, and a first substantially planar major surface and a second opposed major surface having a surface roughness, $R_A$;
   an adhesive provided on the second surface of the polymer layer, the adhesive having an index of refraction, $n_2$, and a thickness of less than 50 $\mu$m, wherein the multiplicative product of $R_A$ and $\Delta n$ is within the range of from about 0.01 to 0.05, where $\Delta n$ is defined as the absolute value of $n_2 - n_1$, and $R_A$ is in $\mu$m; and
   a photoactive layer provided on the side of the adhesive layer opposite the polymer layer.

11. The layered imaging stack of claim 10, wherein the photoactive layer is an insulative photoconductive layer.

12. The layered imaging stack of claim 11, wherein the photoconductive layer is amorphous selenium.

13. The layered imaging stack of claim 10, wherein the thickness of the adhesive layer is within the range of from about 5 $\mu$m to 15 $\mu$m.

14. The layered imaging stack of claim 10, wherein $\Delta n$ is greater than about 0.02.

15. The layered imaging stack of claim 14, wherein $\Delta n$ is less than about 0.08.

16. The layered imaging stack of claim 10, wherein $R_A$ is within the range of from about 0.5 $\mu$m to 2.5 $\mu$m.

17. The layered imaging stack of claim 13, wherein $\Delta n$ is within the range of from about 0.02 to 0.08 and $R_A$ is within the range of from about 0.5 $\mu$m to 2.5 $\mu$m.

* * * * *